(12) United States Patent
Cho et al.

(10) Patent No.: US 10,766,985 B2
(45) Date of Patent: Sep. 8, 2020

(54) OLEFIN POLYMER AND PREPARATION METHOD THEREOF

(71) Applicant: LG CHEM, LTD., Seoul (KR)

(72) Inventors: Sol Cho, Daejeon (KR); Sung Hyun Park, Daejeon (KR); Oh Joo Kwon, Daejeon (KR); Ki Soo Lee, Daejeon (KR); Heon Yong Kwon, Daejeon (KR); Dae Sik Hong, Daejeon (KR); Myung Han Lee, Daejeon (KR); Hyun Jee Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/760,986

(22) PCT Filed: Feb. 22, 2017

(86) PCT No.: PCT/KR2017/001952
§ 371 (c)(1),
(2) Date: Mar. 16, 2018

(87) PCT Pub. No.: WO2017/146464
PCT Pub. Date: Aug. 31, 2017

(65) Prior Publication Data
US 2018/0251584 A1    Sep. 6, 2018

(30) Foreign Application Priority Data

Feb. 24, 2016 (KR) .................... 10-2016-0022085

(51) Int. Cl.
| C08L 23/08 | (2006.01) |
| C08F 210/16 | (2006.01) |
| C08F 4/653 | (2006.01) |
| C08F 4/6592 | (2006.01) |
| C08F 210/02 | (2006.01) |
| C08F 4/659 | (2006.01) |

(52) U.S. Cl.
CPC .......... *C08F 210/02* (2013.01); *C08F 210/16* (2013.01); *C08L 23/0815* (2013.01); *C08F 4/65916* (2013.01); *C08F 4/65925* (2013.01)

(58) Field of Classification Search
CPC . C08F 210/16; C08F 4/65904; C08L 23/0815
See application file for complete search history.

(56) References Cited

U.S. PATENT DOCUMENTS

| 6,153,549 | A | 11/2000 | Hübscher et al. |
| 6,420,298 | B1 | 7/2002 | Mink et al. |
| 8,106,127 | B2 | 1/2012 | De Gracia et al. |
| 9,657,119 | B2 | 5/2017 | Lee et al. |
| 2001/0004657 | A1 | 6/2001 | Saito et al. |
| 2005/0033000 | A1 | 2/2005 | Ohta et al. |
| 2005/0153830 | A1 | 7/2005 | Jensen et al. |
| 2010/0234547 | A1* | 9/2010 | Kolb ...................... C07F 17/00 526/172 |
| 2010/0310799 | A1 | 12/2010 | Nozue et al. |
| 2012/0108766 | A1 | 5/2012 | Berthold et al. |
| 2014/0163126 | A1 | 6/2014 | Tran et al. |
| 2014/0194277 | A1* | 7/2014 | Ishihama ............ C08L 23/0815 502/117 |
| 2015/0011719 | A1 | 1/2015 | Mariott et al. |
| 2015/0017365 | A1 | 1/2015 | Sohn |
| 2015/0225497 | A1 | 8/2015 | Kim et al. |
| 2018/0194873 | A1 | 7/2018 | Kwon et al. |

FOREIGN PATENT DOCUMENTS

| CN | 1922220 | A | 2/2007 |
| CN | 101878237 | A | 11/2010 |
| EP | 3312201 | A2 | 4/2018 |
| JP | 2012214780 | A | 11/2012 |
| JP | 5271518 | B2 | 8/2013 |
| JP | 2013227271 | A | 11/2013 |
| JP | 2013227482 | A | 11/2013 |
| JP | 5487089 | B2 | 5/2014 |
| JP | 5683578 | B2 | 3/2015 |
| JP | 2015227459 | A | 12/2015 |
| KR | 101999028673 | A | 4/1999 |
| KR | 1020020054318 | A | 7/2002 |
| KR | 1020140009470 | A | 1/2014 |
| KR | 1020140049452 | A | 4/2014 |
| KR | 1020140138823 | A | 12/2014 |

(Continued)

OTHER PUBLICATIONS

Cho, et al."Syntheses, characterizations, and olefin polymerizations of methylene-bridged 1,3-dimethylcyclopentadienyl/indenyl and 1,3-dimethylcyclopentadienyl/tetrahydroindenyl zirconium complexes"; Inorganica Chemica Acta, vol. 357, pp. 2301-2308 (2004).

(Continued)

*Primary Examiner* — Caixia Lu
(74) *Attorney, Agent, or Firm* — Dentons US LLP

(57) ABSTRACT

The present invention relates to an olefin polymer and a preparation method thereof. The olefin polymer exhibits excellent mechanical strength and high processability, and thus is expected to be utilized as a material for various products. Particularly, the olefin polymer can be stably produced into films by a melt-blowing process and thus is expected to be usefully used as a material for products prepared by a melt-blowing process.

18 Claims, 2 Drawing Sheets

(56) References Cited

FOREIGN PATENT DOCUMENTS

| | | |
|---|---|---|
| KR | 1020150062004 A | 6/2015 |
| KR | 1020150062145 A | 6/2015 |
| KR | 1020160076415 A | 6/2016 |
| WO | 03016366 A1 | 2/2003 |

OTHER PUBLICATIONS

Chiu, et al."Synthesis, Structural Characterization, and Quantitative Basicity Studies of Lithium Zirconimidate Complexes"; Agnew. Chem. Int. Ed., vol. 47, pp. 6073-6076; (2008).

* cited by examiner

OLEFIN POLYMER AND PREPARATION METHOD THEREOF

CROSS-REFERENCE TO RELATED APPLICATION(S)

This application is a National Stage Application of International Application No. PCT/KR2017/001952 filed on Feb. 22, 2017, which claims the benefit of Korean Patent Application No. 10-2016-0022085 filed on Feb. 24, 2016, all of which are hereby incorporated by reference in their entirety for all purposes as if fully set forth herein. The present invention relates to an olefin polymer and a method for preparing the same.

TECHNICAL FIELD

Background Art

Conventional linear low-density polyethylene (LLDPE) is excellent in mechanical properties, but bubble stability, etc. are poor. Thus, there is a problem that it is difficult to stably form a film when processed by a melt-blowing process, etc. In order to solve these problems, a method of using LLDPE in combination with LDPE (low-density polyethylene) has been introduced. When a method of adding LDPE to LLDPE is employed, the bubble stability is improved, and thus a blown film can be stably formed by a melt-blowing process or the like. However, the method of adding LDPE to LLDPE has caused a problem of remarkably lowering the mechanical properties of conventional LLDPE even when a very small amount of LDPE was added.

DETAILED DESCRIPTION OF THE INVENTION

Technical Problem

It is an object of the present invention to provide an olefin polymer having excellent mechanical strength and processability.

It is another object of the present invention to provide a method for preparing the olefin polymer.

Technical Solution

According to one embodiment of the present invention, there is provided an olefin polymer having an SF of 65 or more which is calculated by the following Equation 1:

$$SF = Mw/10^4 + 5/(Mw/10^5) * \exp(\text{ratio of increase in elongational viscosity})$$  [Equation 1]

in the above equation 1, Mw means a weight average molecular weight, the ratio of increase in elongational viscosity is a value in which the highest elongational viscosity value measured for the olefin polymer at Hencky strain rate of 1 s$^{-1}$ at 170° C. using an elongational viscosity fixture attached to the ARES rheometer is divided by the elongational viscosity value of the extrapolated straight line at the time when the highest elongational viscosity value is obtained, wherein the extrapolated straight line is a straight line in which a straight line having the average slope of the section where the elongational viscosity increases steadily with time is extended to a section where the elongational viscosity increases sharply while maintaining the above average slope.

The olefin polymer may have a ratio of increase in elongational viscosity of 2.5 or more.

The olefin polymer may have a density of 0.910 g/cm$^3$ to 0.940 g/cm$^3$.

The olefin polymer may have a number average molecular weight of 20,000 to 50,000 g/mol.

The olefin polymer may have a weight average molecular weight of 100,000 to 160,000 g/mol.

The olefin polymer may have a melt index of 0.5 g/10 min or more and less than 3 g/10 min, which is measured at a temperature of 190° C. under a load of 2.16 kg according to standard ASTM D 1238.

The olefin polymer may have MFRR (21.6/2.16) of 20 or more and less than 40 in which a melt flow rate (MFR$_{21.6}$) measured at a temperature of 230° C. under a load of 21.6 kg according to ISO 1133 is divided by a melt flow rate (MFR$_{2.16}$) measured at a temperature of 230° C. under a load of 2.16 kg according to ISO 1133.

The olefin polymer may be a copolymer of ethylene and alpha olefin, wherein the alpha olefin may be propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof.

Meanwhile, according to another embodiment of the present invention, there is provided a method for preparing an olefin polymer, the method comprising a step of polymerizing an olefin monomer in the presence of a hybrid supported catalyst comprising a carrier, a crosslinking type transition metal compound represented by the following Chemical Formula 1 that is supported on the carrier, and a non-crosslinking type transition metal compound represented by the following Chemical Formula 2 that is supported on the carrier:

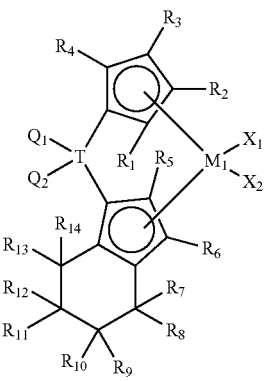

[Chemical Formula 1]

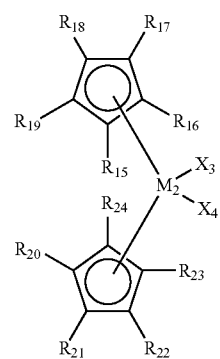

[Chemical Formula 2]

in the above formulae 1 and 2, $M_1$ and $M_2$ are the same as or different from each other, and each independently represent Ti, Zr or Hf, $X_1$, $X_2$, $X_3$ and $X_4$ are the same as or different from each other, and each independently represent any one of halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T is C, Si, Ge, Sn or Pb, $Q_1$ and $Q_2$ are the same as or different from each other, and each independently represent any one of hydrogen, halogen, an alkyl group having 1 to 20 carbon atoms, a heterocycloalkyl group having 2 to 20 carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms, and a heteroaryl group having 5 to 20 carbon atoms, $R_1$ to $R_6$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, $R_7$ to $R_{14}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_7$ to $R_{14}$ are connected with each other to form a substituted or unsubstituted aliphatic or aromatic ring, and $R_{15}$ to $R_{24}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_{15}$ to $R_{24}$ are connected with each other to form a substituted or unsubstituted aliphatic or aromatic ring.

In Chemical Formula 1, $R_1$ to $R_4$ may be each independently any one of hydrogen, an alkyl group having 1 to 20 carbon atoms, an alkoxy group having 1 to 20 carbon atoms, and an alkenyl group having 2 to 20 carbon atoms.

In Chemical Formula 1, $R_5$ and $R_6$ may be each independently any one of hydrogen, an alkyl group having 1 to 20 carbon atoms, an alkoxy group having 1 to 20 carbon atoms, and an alkenyl group having 2 to 20 carbon atoms.

In Chemical Formula 1, $R_7$ to $R_{14}$ may be each independently any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of $R_7$ to $R_{14}$ are connected with each other to form a substituted or unsubstituted aliphatic ring.

In Chemical Formula 1, $Q_1$ to $Q_2$ may be each independently any one of an alkyl group having 1 to 20 carbon atoms and an aryl group having 6 to 20 carbon atoms.

In Chemical Formula 1, $X_1$ to $X_4$ may be each independently any one of halogen, an alkyl group having 1 to 20 carbon atoms, and an alkoxy group having 1 to 20 carbon atoms.

In Chemical Formula 2, $R_{15}$ to $R_{24}$ may be each independently any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of $R_{15}$ to $R_{24}$ are connected with each other to form a substituted or unsubstituted aliphatic ring.

The crosslinking type transition metal compound represented by Chemical Formula 1 may be any one of compounds represented by Chemical Formulas 3 and 4 below:

[Chemical Formula 3]

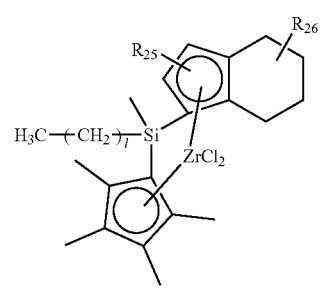

[Chemical Formula 4]

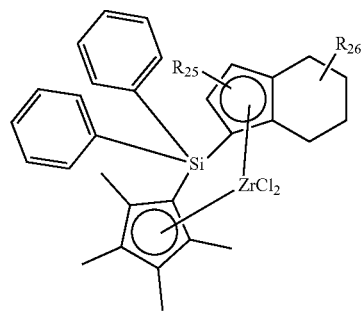

in the above formulae 3 and 4, $R_{25}$ and $R_{26}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silyl alkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and l is an integer between 0 and 5.

The non-crosslinking type transition metal compound represented by Chemical Formula 2 may be any one of compounds represented by Chemical Formulas 5 and 6 below:

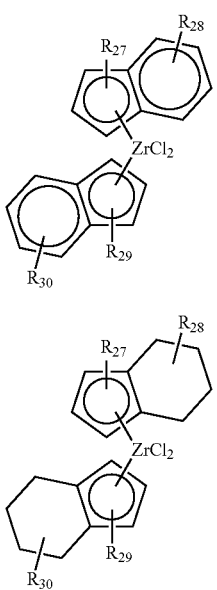

[Chemical Formula 5]

[Chemical Formula 6]

in the above formulae 5 and 6, $R_{27}$ to $R_{30}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silyl alkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms.

The hybrid supported catalyst may further include at least one cocatalyst selected from the group consisting of compounds represented by Chemical Formulas 7 to 9 below, in order to activate the transition metal compounds represented by Chemical Formulas 1 and 2:

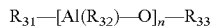

[Chemical Formula 7]

in the above formula 7, $R_{31}$, $R_{32}$ and $R_{33}$ are each independently any one of hydrogen, halogen, a hydrocarbyl group having 1 to 20 carbon atoms and a hydrocarbyl group having 1 to 20 carbon atoms substituted with halogen, and n is an integer of 2 or more,

[Chemical Formula 8]

in the above formula 8,

D is aluminum or boron, $R_{34}$ are each independently any one of halogen, a hydrocarbyl group having 1 to 20 carbon atoms, and a hydrocarbyl group having 1 to 20 carbon atoms substituted with halogen,

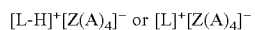

[Chemical Formula 9]

in the above formula 9,

L is a neutral or cationic Lewis base, H is a hydrogen atom,

Z is a Group 13 element, and A is each independently any one of a hydrocarbyl group having 1 to 20 carbon atoms; a hydrocarbyloxy group having 1 to 20 carbon atoms; and substituents in which at least one hydrogen atom of the above substituents is substituted with at least one substituent of halogen, a hydrocarbyloxy group having 1 to 20 carbon atoms and a hydrocarbylsilyl group having 1 to 20 carbon atoms.

In the hybrid supported catalyst, the carrier may be silica, alumina, magnesia, or a mixture thereof.

In the hybrid supported catalyst, a crosslinking type transition metal compound represented by Chemical Formula 1 and a non-crosslinking type transition metal compound represented by Chemical Formula 2 may be contained in a weight ratio of 50:1 to 1:1.

In the method for preparing the olefin polymer, ethylene and alpha olefin may be used as the olefin monomer. Examples of the alpha olefin include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof.

Advantageous Effects

The olefin polymer according to one embodiment of the present invention exhibits excellent mechanical strength and high processability and thus is expected to be utilized as a raw material for various products. In particular, the olefin polymer can be stably produced by the melt-blowing process, and thus is expected to be usefully used as a raw material for the product produced by the melt-blowing process.

DETAILED DESCRIPTION OF THE EMBODIMENTS

Figure 1:
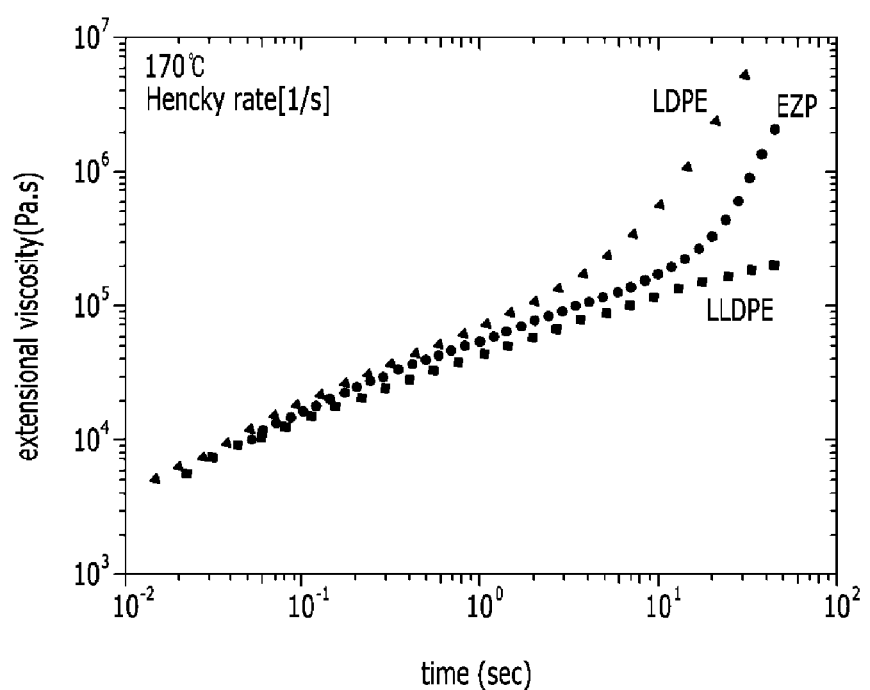
FIG. 1 is a graph showing a change in elongational viscosity according to time of conventional LLDPE, an olefin polymer (represented by EZP) according to one embodiment of the present invention, and LDPE.

Hereinafter, an olefin polymer and a method for preparing the olefin polymer according to specific embodiments of the invention will be described.

According to an embodiment of the present invention, there is provided an olefin polymer having an SF of 65 or more which is calculated by the following Equation 1:

$$SF=Mw/10^4+5/(Mw/10^5)*\exp(\text{ratio of increase in elongational viscosity}) \quad \text{[Equation 1]}$$

in the above equation 1, Mw means a weight average molecular weight, the ratio of increase in elongational viscosity is a value in which the highest elongational viscosity value measured for the olefin polymer at Hencky strain rate of 1 s$^{-1}$ at 170° C. using an elongational viscosity fixture attached to the ARES rheometer is divided by the elongational viscosity value of the extrapolated straight line at the time when the highest elongational viscosity value is obtained, wherein the extrapolated straight line is a straight line in which a straight line having the average slope of the section where the elongational viscosity increases steadily with time is extended to a section where the elongational viscosity increases sharply while maintaining the above average slope.

Conventional linear low-density polyethylene (LLDPE) is excellent in mechanical properties, but bubble stability, etc. are poor. Thus, there is a problem that it is difficult to stably form a film when processed by a melt-blowing process, etc. In order to solve these problems, a method of using LLDPE in combination with LDPE (low-density polyethylene) has been introduced. When a method of adding LDPE to LLDPE is employed, the bubble stability is improved, and thus a blown film can be stably formed by a melt-blowing process or the like. However, the method of adding LDPE to LLDPE has caused a problem of remarkably lowering the mechanical properties of conventional LLDPE even when a very small amount of LDPE was added.

Accordingly, the present inventors have developed a new olefin polymer having improved bubble stability while exhibiting mechanical properties equivalent to or superior to than those of conventional LLDPE, by introducing LCB (long chain branch) into LLDPE.

The olefin polymer according to the above embodiment has a feature that the SF (strength factor) calculated by Equation 1 is 65 or more, 70 or more, 75 or more, or 80 or more.

The content of LCB in the olefin polymer can be digitized through SF calculated by substituting the weight average molecular weight of the olefin polymer and the ratio of increase in elongational viscosity into Equation 1. The melt strength, which is one of the physical properties of the olefin polymer, also tends to increase according to the content of LCB in the olefin polymer. However, when the molecular weight of the olefin polymer is small, the melt strength is greatly affected by the change in the LCB content as compared with the case where the molecular weight is large, and there is a limit to accurately predict the LCB content. On the other hand, the SF calculated by Equation 1 can objectively predict the LCB content of the olefin polymer having various molecular weights by including the weight average molecular weight factor in Chemical Formula 1.

The weight average molecular weight (Mw) of Equation 1 is a value based on the standard polystyrene measured by gel permeation chromatography (GPC). However, the weight average molecular weight is not limited thereto and it may be measured by other methods known in the technical field to which the present invention belongs.

The ratio of increase in elongational viscosity of Equation 1 is a value in which the highest elongational viscosity value measured for the olefin polymer at Hencky strain rate of $1\ s^{-1}$ at 170° C. using an elongational viscosity fixture attached to the ARES rheometer is divided by the elongational viscosity value of the extrapolated straight line at the time when the highest elongational viscosity value is obtained.

Specifically, when the elongational viscosity of the olefin polymer is measured using an elongational viscosity fixture attached to an ARES rheometer, a graph capable of confirming the change in elongational viscosity (unit: Pa*s) with time as shown in FIGS. 1 and 2 can be obtained.

Figure 2:
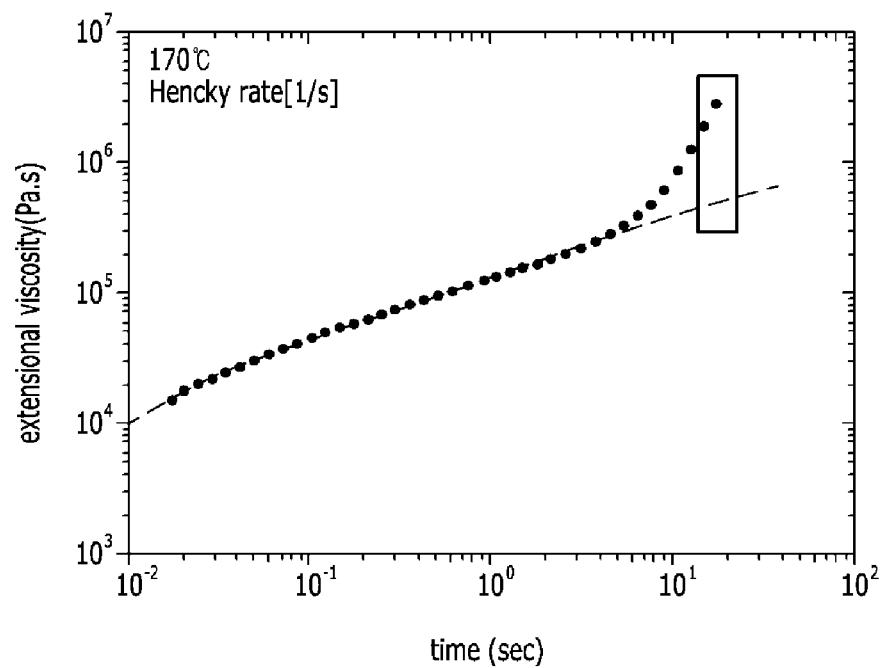
FIG. 2 is a graph showing a change in elongational viscosity according to the time of an olefin polymer according to an embodiment of the present invention, which is a graph showing an extrapolated straight line which a straight line having the average slope of the section where the elongational viscosity increases steadily with time is extended to a section where the elongational viscosity increases sharply while maintaining the above average slope.

Referring to FIG. 1, in the case of conventional LLDPE, the elongational viscosity tends to increase steadily with time, but it does not exhibit strain-hardening properties in which the elongational viscosity increases sharply. On the other hand, in the case of the olefin polymer according to one embodiment of the present invention, it shows strain hardening properties in which the elongational viscosity increases steadily with time, and then the elongational viscosity increases sharply. It can be predicted that as such strain-hardening properties are severely exhibited, that is, as the elongational viscosity increases more sharply, the content of LCB in the olefin polymer tends to be higher. Furthermore, it can be predicted to exhibit more excellent processablity during the formation of a film using the olefin polymer. Referring to FIG. 1, it is generally confirmed that strain-hardening properties are more severely exhibited in the case of LDBE containing a large amount of LCB.

In order to digitize the degree of strain-hardening properties, the ratio of increase in elongation viscosity was determined on the basis of the following criteria. Specifically, the ratio of increase in elongation viscosity was determined by dividing the measured highest elongational viscosity value by the elongation viscosity value of the extrapolated straight line at the time when the highest elongation viscosity value is obtained. Here, the extrapolated straight line means a straight line in which a straight line having the average slope of the section where the elongational viscosity increases steadily with time is extended to a section where the elongational viscosity increases sharply while maintaining the above average slope, as shown in FIG. 2. The section where the elongational viscosity increases steadily with time means a section in which the X axis (time) is 0.001 second to 1 second, 0.001 second to 0.5 second, or 0.01 second to 0.5 second, and the section where the elongational viscosity increases sharply means a section after a section where the elongational viscosity increases steadily with time, that is, a section where the X-axis (time) exceeds 0.5 seconds or a section where the X-axis (time) exceeds 1 second. Therefore, the extrapolated straight line means a straight line in which the straight line of the section where the X axis (time) is 0.001 second to 1 second, 0.001 second to 0.5 second, or 0.01 second to 0.5 second is extended to a section where X axis (time) exceeds 0.5 second to 1 second, while maintaining the slope of the straight line.

As an example, the extrapolated straight line can be obtained using Extrapolate in OriginPro 8.6 program. Specifically, the extrapolated straight line can be obtained by extending a straight line (a graph of the elongational viscosity actually measured with time) obtained by specifying the section of the X axis from 0.01 to 0.5 in Extrapolate Manu to a section where the elongational viscosity increases sharply. At his time, in order to obtain the extrapolated straight line, the method uses B-Spline, and apparent interpolation is used in Extrapolate Manu.

The olefin polymer according to one embodiment described above can have the ratio of increase in elongational viscosity of 2.5 or more in order to exhibit improved processability while maintaining excellent mechanical strength. The upper limit of the ratio of increase in elongational viscosity is 5 or less, 4 or less, or 3.5 or less in order to maintain sufficient mechanical strength.

As the value of SF calculated by Equation 1 is higher, it can secure excellent processability at the time of film formation, and thus the upper limit of the SF is not particularly limited. As a non-limiting example, the SF may be adjusted to 200 or less or 150 or less.

The olefin polymer according to one embodiment may exhibit physical properties similar to those of LLDPE in order to maintain excellent mechanical properties of conventional LLDPE.

As an example, the olefin polymer can have a density of 0.910 g/cm³ to 0.940 g/cm³. The olefin polymer has a number average molecular weight of 20,000 to 50,000 g/mol and a weight average molecular weight of 100,000 to 160,000 g/mol. The olefin polymer can have a melt index of 0.5 g/10 min or more and less than 3 g/10 min, which is measured at a temperature of 190° C. under a load of 2.16 kg according to standard ASTM D1238. The olefin polymer may have MFRR (21.6/2.16) of 20 or more and less than 40 in which a melt flow rate ($MFR_{21.6}$) measured at a temperature of 230° C. under a load of 21.6 kg according to ISO 1133 is divided by a melt flow rate ($MFR_{2.16}$) measured at a temperature of 230° C. under a load of 2.16 kg according to ISO 1133.

Even if the SF calculated by Equation 1 satisfies the above-mentioned range, unless the density, number average molecular weight, the weight average molecular weight, the melt index, the MFRR and the like as described above are satisfied as in the case of LDPE, sufficient mechanical strength is not exhibited. Thus, even though processability is excellent, it is a difficult to apply to actual products. The olefin polymer according to the above embodiment can have at least one of the physical properties mentioned above and can have all the physical properties described above in order to exhibit excellent mechanical strength.

The olefin polymer exhibiting these physical properties may be, for example, a copolymer of ethylene and alpha olefin. In this case, the alpha olefin may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof. Among them, the olefin polymer may be a copolymer of ethylene and 1-hexene. When the olefin polymer according to one embodiment is the copolymer described above, the physical properties described above can be more easily realized. However, the type of the olefin polymer according to one embodiment is not limited to the above-described types, and various types of olefin polymers known in the technical field to which the present invention belongs may be provided as long as they can exhibit the above-described physical properties.

The olefin polymer according to one embodiment exhibits excellent mechanical properties and processability and thus can be usefully used in various application fields. In particular, the olefin polymer has excellent bubble stability and thus can stably form a blown film by a melt-blowing process or the like. As an example, the olefin polymer according to the above embodiment can stably provide a blown film even when the blow-up ratio (BUR) has been adjusted to 2.7 or more, as described in Test Examples described later.

Meanwhile, according to another embodiment of the present invention, a method for preparing the olefin polymer is provided. Specifically, the method for preparing the olefin polymer comprises a step of polymerizing an olefin monomer in the presence of a hybrid supported catalyst comprising a carrier, a crosslinking type transition metal compound represented by the following Chemical Formula 1 that is supported on the carrier, and a non-crosslinking type transition metal compound represented by the following Chemical Formula 2 that is supported on the carrier:

[Chemical Formula 1]

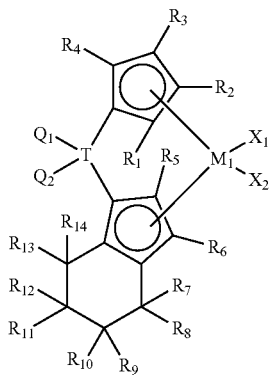

[Chemical Formula 2]

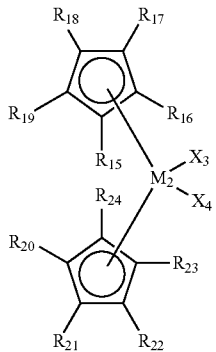

in the above formulae 1 and 2, $M_1$ and $M_2$ are the same as or different from each other, and each independently represent Ti, Zr or Hf, $X_1$, $X_2$, $X_3$ and $X_4$ are the same as or different from each other, and each independently represent any one of halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T is C, Si, Ge, Sn or Pb, $Q_1$ and $Q_2$ are the same as or different from each other, and each independently represent any one of hydrogen, halogen, an alkyl group having 1 to 20 carbon atoms, a heterocycloalkyl group having 2 to 20 carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms, and a heteroaryl group having 5 to 20 carbon atoms, $R_1$ to $R_6$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, $R_7$ to $R_{14}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_7$ to $R_{14}$ are connected with each other to form a substituted or unsubstituted aliphatic or aromatic ring, and $R_{15}$ to $R_{24}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_{15}$ to $R_{24}$ are be connected with each other to form a substituted or unsubstituted aliphatic or aromatic ring.

Unless otherwise specified, the following definitions shall apply to the terms used in the specification.

The halogen may be fluorine (F), chlorine (Cl), bromine (Br) or iodine (I).

The alkyl group having 1 to 20 carbon atoms can be a linear, branched or cyclic alkyl group. Specifically, the alkyl group having 1 to 20 carbon atoms is preferably a linear alkyl group having 1 to 20 carbon atoms; a linear alkyl group having 1 to 10 carbon atoms; a linear alkyl group having 1 to 5 carbon atoms; a branched or cyclic alkyl group having 3 to 20 carbon atoms; a branched or cyclic alkyl group having 3 to 15 carbon atoms; or a branched or cyclic alkyl group having 3 to 10 carbon atoms. More specifically, the alkyl group having 1 to 20 carbon atoms is a methyl group, an ethyl group, a n-propyl group, an isopropyl group, an n-butyl group, an isobutyl group, a tert-butyl group, an n-pentyl group, an isopentyl group, a neopentyl group, a cyclohexyl group, or the like.

The heterocycloalkyl group having 2 to 20 carbon atoms can be a cyclic alkyl group containing an atom other than one or more carbon atoms exemplified as oxygen, nitrogen, sulfur or the like. Specifically, the heterocycloalkyl group having 2 to 20 carbon atoms may be a heterocycloalkyl group having 2 to 15 carbon atoms, a heterocycloalkyl group having 2 to 10 carbon atoms or a heterocycloalkyl group having 4 to 7 carbon atoms. More specifically, the heterocycloalkyl group having 2 to 20 carbon atoms may be an epoxy group, a tetrahydrofuranyl group, a tetrahydropyranyl group, a tetrahydrothiophenyl group, a tetrahydropyrrolyl group, or the like.

The alkoxy group having 1 to 20 carbon atoms may be a linear, branched or cyclic alkoxy group. Specifically, the alkoxy group having 1 to 20 carbon atoms may be a linear alkoxy group having 1 to 20 carbon atoms; a linear alkoxy group having 1 to 10 carbon atoms; a linear alkoxy group having 1 to 5 carbon atoms; a branched or cyclic alkoxy group having 3 to 20 carbon atoms; a branched or cyclic alkoxy group having 3 to 15 carbon atoms; or a branched or cyclic alkoxy group having 3 to 10 carbon atoms. More specifically, the alkoxy group having 1 to 20 carbon atoms may be a methoxy group, an ethoxy group, an n-propoxy group, an iso-propoxy group, a n-butoxy group, an iso-butoxy group, a tert-butoxy group, an n-pentoxy group, an iso-pentoxy group, a neo-pentoxy group, a cycloheptoxy group, or the like.

The alkoxyalkyl group having 2 to 20 carbon atoms may have a structure containing $-R^a-O-R^b$ and may be a substituent in which at least one hydrogen of the alkyl group ($-R^a$) is substituted with an alkoxy group ($-O-R^b$). Specifically, the alkoxyalkyl group having 2 to 20 carbon atoms may be a methoxymethyl group, a methoxyethyl group, an ethoxymethyl group, an isopropoxymethyl group, an isopropoxyethyl group, an iso-propoxyhexyl group, a tert-butoxymethyl group, a tert-butoxyethyl group, a tert-butoxyhexyl group, or the like.

The silyl group having 1 to 20 carbon atoms may be a substituent in which at least one hydrogen of $-SiH_3$ is substituted with an alkyl group or an alkoxy group. Specifically, the silyl group having 1 to 20 carbon atoms may be a methylsilyl group, a dimethylsilyl group, a trimethylsilyl group, a dimethylethylsilyl group, a diethylmethylsilyl group, a dimethylpropylsilyl group, a methoxysilyl group, a dimethoxysilyl group, a trimethoxysilyl group, a dimethoxyethoxysilyl group, a diethoxymethylsilyl group, a dimethoxypropylsilyl group, or the like.

The silylalkyl group having 1 to 20 carbon atoms may be a substituent in which at least one hydrogen of the alkyl group is substituted with a silyl group. Specifically, the silylalkyl group having 1 to 20 carbon atoms may be a dimethoxypropylsilylmethyl group or the like.

The silyloxyalkyl group having 1 to 20 carbon atoms may be a substituent in which at least one hydrogen of the alkyl group is substituted with a silyloxy group. Specifically, the silyloxyalkyl group having 1 to 20 carbon atoms may be a dimethoxypropylsilyloxymethyl group or the like.

The alkenyl group having 2 to 20 carbon atoms may be a linear, branched or cyclic alkenyl group. Specifically, the alkenyl group having 2 to 20 carbon atoms include a linear alkenyl group having 2 to 20 carbon atoms, a linear alkenyl group having 2 to 10 carbon atoms, a linear alkenyl group having 2 to 5 carbon atoms, a branched alkenyl group having 3 to 20 carbon atoms, a branched alkenyl group having 3 to 15 carbon atoms, a branched alkenyl group having 3 to 10 carbon atoms, a cyclic alkenyl group having 5 to 20 carbon atoms, or a cyclic alkenyl group having 5 to 10 carbon atoms. More specifically, the alkenyl group having 2 to 20 carbon atoms may be an ethenyl group, a propenyl group, a butenyl group, a pentenyl group or a cyclohexenyl group.

The carboxylate having 1 to 20 carbon atoms may have a structure of $-COOR^c$, wherein $R^c$ may be a hydrocarbyl group having 1 to 20 carbon atoms. The hydrocarbyl group may be a monovalent functional group in which a hydrogen atom is removed from the hydrocarbon, and may include an alkyl group, an aryl group, and the like. Specifically, the carboxylate having 1 to 20 carbon atoms may be a pivalate or the like.

The aryl group having 6 to 20 carbon atoms may mean a monocyclic, bicyclic or tricyclic aromatic hydrocarbon. In addition, the aryl group may be used as a word to include an aralkyl group in which at least one hydrogen of the alkyl group is substituted with an aryl group. Specifically, the aryl group having 6 to 20 carbon atoms may be a phenyl group, a naphthyl group, an anthracenyl group, a benzyl group or the like.

The heteroaryl group having 5 to 20 carbon atoms may be a cyclic aryl group including at least one atom other than carbon exemplified as oxygen, nitrogen, sulfur and the like. Specifically, the heteroaryl group having 5 to 20 carbon atoms may be a heteroaryl group having 5 to 15 carbon atoms or a heteroaryl group having 5 to 10 carbon atoms. More specifically, the heteroaryl group having 5 to 20 carbon atoms may be a furanyl group, a pyranyl group, a thiophenyl group, a pyrrolyl group or the like.

The sulfonate group having 1 to 20 carbon atoms may have the structure of $-O-SO_2-R^d$, wherein $R^d$ may be a hydrocarbyl group having 1 to 20 carbon atoms. Specifically, the sulfonate group having 1 to 20 carbon atoms may be a methane sulfonate group, a phenyl sulfonate group, or the like.

The sulfone group having 1 to 20 carbon atoms has the structure of —$R^{e'}$—$SO_2$—$R^{e''}$ wherein $R^{e'}$ and $R^{e''}$ are the same as or different from each other and each independently represent a hydrocarbyl group having 1 to 20 carbon atoms. Specifically, the sulfone group having 1 to 20 carbon atoms may be a methylsulfonylmethyl group, a methylsulfonylpropyl group, a methylsulfonylbutyl group, a phenylsulfonylpropyl group or the like.

In the present specification, the phrase "one or more pairs of adjacent substituents are connected with each other to form a substituted or unsubstituted aliphatic or aromatic ring" means that one or more pairs of adjacent substituents among two adjacent substituents are connected with each other to form an aliphatic or aromatic ring, and the aliphatic or aromatic ring may be substituted by any substituent. For example, a pair of adjacent substituents $R_{16}$ and $R_{17}$ of Chemical Formula 2 may be connected with each other to form an unsubstituted aromatic ring (when $R_{28}$ is hydrogen), or a substituted aromatic ring (when $R_{28}$ is not hydrogen), similarly to Chemical Formula 5 as described below. Also, a pair of adjacent substituents $R_{16}$ and $R_{17}$ of Chemical Formula 2 may be connected with each other to form an unsubstituted aliphatic ring (when $R_{28}$ is hydrogen), or a substituted aliphatic ring (when $R_{28}$ is not hydrogen), similarly to Chemical Formula 6 as described below.

The above-mentioned substituents may be optionally substituted with one or more substituents selected from the group consisting of a hydroxyl group, a halogen, an alkyl group, a heterocycloalkyl group, an alkoxy group, an alkenyl group, a silyl group, a phosphine group, a phosphide group, a sulfonate group, a sulfone group, an aryl group, and a heteroaryl group within the range that exerts the same or similar effect as the intended effect When using a hybrid supported catalyst in which the crosslinking type transition metal compound represented by Chemical Formula 1 and the non-crosslinking type transition metal compound represented by Chemical Formula 2 are mixed, an olefin polymer having a structure in which an LCB is introduced into LLDPE can be prepared. Such an olefin polymer can satisfy the above-described range of SF calculated by Equation 1, and thus can exhibit excellent mechanical properties and processability at the same time.

Hereinafter, the structures of the transition metal compounds of Chemical Formulas 1 and 2 will be described in detail.

The cyclopentadienyl ligand in the structure of the crosslinking type transition metal compound represented by Chemical Formula 1 may affect, for example, the polymerization activity of the olefin monomer and the physical properties of the olefin polymer.

$R_1$ to $R_4$ of the cyclopentadienyl ligand are each independently any one of hydrogen, an alkyl group having 1 to 20 carbon atoms, an alkoxy group having 1 to 20 carbons and an alkenyl group having 2 to 20 carbons. More specifically, $R_1$ to $R_4$ may be independently any one of a methyl group, an ethyl group, a propyl group, and a butyl group. In this case, the hybrid supported catalyst can exhibit a very high activity in the polymerization process of the olefin monomer, and can provide an olefin polymer having desired physical properties.

Further, the tetrahydroindenyl ligand in the structure of the crosslinking type transition metal compound represented by Chemical Formula 1 can easily adjust the molecular weight of the prepared olefin polymer by controlling the degree of steric hindrance depending on the type of the substituted functional group.

In Chemical Formula 1, $R_5$ and $R_6$ are each independently any one of hydrogen, an alkyl group having 1 to 20 carbon atoms, an alkoxy group having 1 to 20 carbon atoms and an alkenyl group having 2 to 20 carbon atoms, or $R_7$ to $R_{14}$ are each independently any one of hydrogen, an alkyl group having 1 to 20 carbon atoms, an alkoxy group having 1 to 20 carbon atoms and an alkenyl group having 2 to 20 carbon atoms, or one or more pairs of adjacent substituents of $R_7$ to $R_{14}$ are connected with each other to form a substituted or unsubstituted aliphatic ring. More specifically, in Chemical Formula 1, $R_5$ and $R_6$ are each independently any one of hydrogen, an alkyl group having 1 to 4 carbon atoms, an alkoxy group having 1 to 4 carbon atoms and an alkenyl group having 2 to 4 carbon atoms or $R_7$ to $R_{14}$ are each independently any one of hydrogen, an alkyl group having 1 to 4 carbon atoms, an alkoxy group having 1 to 4 carbon atoms and an alkenyl group having 2 to 4 carbon atoms, or one or more pairs of adjacent substituents of $R_7$ to $R_{14}$ are connected with each other to form a substituted or unsubstituted aliphatic ring. In such a case, the hybrid supported catalyst can provide an olefin polymer having excellent processability.

The cyclopentadienyl ligand and the tetrahydroindenyl ligand can be crosslinked by -T($Q_1$)($Q_2$)- to exhibit excellent stability.

In order to more effectively ensure these effects, transition metal compounds wherein $Q_1$ and $Q_2$ are each independently any one of an alkyl group having 1 to 20 carbon atoms and an aryl group having 6 to 20 carbon atoms can be used. More specifically, a transition metal compound in which $Q_1$ and $Q_2$ are the same as each other and is any one of a methyl group, an ethyl group, a propyl group, a butyl group, a phenyl group and a benzyl group can be used. And T may be C, Si, Ge, Sn or Pb; C or Si; or Si.

Meanwhile, $M_1(X_1)(X_2)$ exists between the crosslinked cyclopentadienyl ligand and the tetrahydroindenyl ligand, and $M_1(X_1)(X_2)$ may affect the storage stability of the metal complex.

In order to more effectively ensure these effects, a transition metal compound in which $X_1$ and $X_2$ are each independently any one of halogen, an alkyl group having 1 to 20 carbon atoms and an alkoxy group having 1 to 20 carbon atoms can be used. More specifically, a transition metal compound in which $X_1$ and $X_2$ are each independently F, Cl, Br or I can be used. And $M_1$ is Ti, Zr or Hf; Zr or Hf; or Zr.

As an example, the crosslinking type transition metal compound capable of providing an olefin polymer having improved processability may include compounds represented by Chemical Formulas 3 and 4 below:

[Chemical Formula 3]

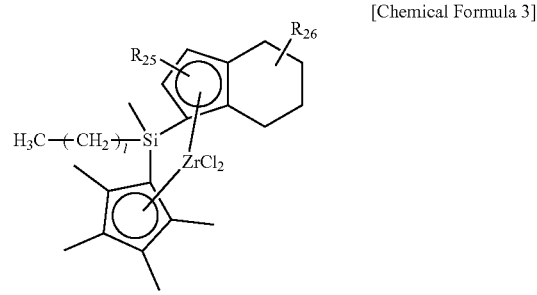

[Chemical Formula 4]

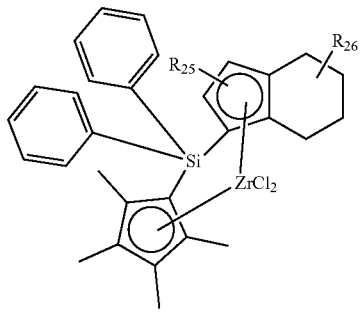

in the above formulae 3 and 4, $R_{25}$ and $R_{26}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silyl alkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and l is an integer between 0 and 5.

$R_{25}$ and $R_{26}$, which are substituents of the tetrahydroindenyl ligand in Chemical Formulas 3 and 4, are each independently any one of hydrogen, an alkyl group having 1 to 20 carbon atoms, an alkoxy group having 1 to 20 carbon atoms, an alkenyl group having 2 to 20 carbon atoms and an aryl group having 6 to 20 carbon atoms; or any one of hydrogen, an alkyl group having 1 to 4 carbon atoms, an alkoxy group having 1 to 4 carbon atoms, an alkenyl group having 2 to 4 carbon atoms, and an aryl group having 6 to 10 carbon atoms.

Meanwhile, two ligands in the structure of the non-crosslinking type transition metal compound represented by Chemical Formula 2 may affect, for example, the polymerization activity of the olefin monomer and the physical properties of the olefin polymer.

$R_{15}$ to $R_{24}$ of the two ligands are each independently any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of $R_{15}$ to $R_{24}$ are connected with each other to form a substituted or unsubstituted aliphatic ring. More specifically, $R_{15}$ to $R_{24}$ are each independently any one of hydrogen, an alkyl group having 1 to 6 carbon atoms, an alkoxy group having 1 to 6 carbon atoms, and an alkenyl group having 2 to 6 carbon atoms, or one or more pairs of adjacent substituents of $R_{15}$ to $R_{24}$ are connected with each other to form a substituted or unsubstituted aliphatic ring. In this case, the hybrid supported catalyst can provide an olefin polymer exhibiting excellent processability while exhibiting excellent mechanical properties.

$M_2(X_3)(X_4)$ exists between the two ligands, and $M_2(X_3)(X_4)$ may affect the storage stability of the metal complex.

In order to more effectively ensure these effects, a transition metal compound in which $X_3$ and $X_4$ are each independently any one of halogen, an alkyl group having 1 to 20 carbon atoms and an alkoxy group having 1 to 20 carbon atoms can be used. More specifically, a transition metal compound in which $X_3$ and $X_4$ are each independently F, Cl, Br or I can be used. And $M_2$ is Ti, Zr or Hf; Zr or Hf; or Zr.

As an example, the non-crosslinking type transition metal compound capable of providing an olefin polymer having improved processability may include compounds represented by Chemical Formulas 5 and 6 below:

[Chemical Formula 5]

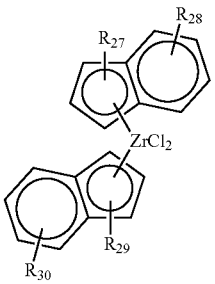

[Chemical Formula 6]

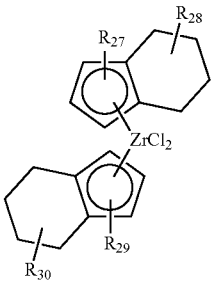

in the above formulae 5 and 6, $R_{27}$ to $R_{30}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silyl alkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms.

More specifically, in Chemical Formulas 5 and 6, $R_{27}$ to $R_{30}$, which are substituents of two ligands, are any one of hydrogen, an alkyl group having 1 to 6 carbon atoms, an alkoxy group having 1 to 6 carbon atoms, an alkenyl group having 2 to 6 carbon atoms and an aryl group having 6 to 10 carbon atoms. When a non-crosslinking type transition metal compound having such a structure is used, it is possible to produce a hybrid supported catalyst which can more stably provide the olefin polymer having the above-mentioned properties.

The transition metal compounds represented by Chemical Formulas 1 and 2 can be synthesized by applying known reactions, and for a more detailed synthesis method, reference can be made to Preparation Examples described later.

The hybrid supported catalyst according to one embodiment may further include a cocatalyst in order to activate the crosslinking type and non-crosslinking type transition metal compounds. As the cocatalyst, those commonly used in the technical field to which the present invention belongs can be applied without particular limitation. As a non-limiting example, the cocatalyst can be one or more compounds selected from the group consisting of the compounds represented by Chemical Formulas 7 to 9 below:

$$R_{31}—[Al(R_{32})—O]_n—R_{33} \quad \text{[Chemical Formula 7]}$$

in the above formula 7, $R_{31}$, $R_{32}$ and $R_{33}$ are each independently any one of hydrogen, halogen, a hydrocarbyl group having 1 to 20 carbon atoms and a hydrocarbyl group having 1 to 20 carbon atoms substituted with halogen, and n is an integer of 2 or more, $$D(R_{34})_3 \qquad \text{[Chemical Formula 8]}$$

in the above formula 8,

D is aluminum or boron, each $R_{34}$ is independently any one of halogen, a hydrocarbyl group having 1 to 20 carbon atoms, and a hydrocarbyl group having 1 to 20 carbon atoms substituted with halogen, $$[L\text{-}H]^+[Z(A)_4]^- \text{ or } [L]^+[Z(A)_4]^- \qquad \text{[Chemical Formula 9]}$$

in the above formula 9,

L is a neutral or cationic Lewis base, H is a hydrogen atom,

Z is a Group 13 element, and A is each independently any one of a hydrocarbyl group having 1 to 20 carbon atoms; a hydrocarbyloxy group having 1 to 20 carbon atoms; and substituents in which at least one hydrogen atom of the above substituents is substituted with at least one substituent of halogen, a hydrocarbyloxy group having 1 to 20 carbon atoms and a hydrocarbylsilyl group having 1 to 20 carbon atoms.

Non-limiting examples of the compound represented by Chemical Formula 7 include methyl aluminoxane, ethyl aluminoxane, isobutyl aluminoxane, tert-butyl aluminoxane, and the like, and non-limiting examples of the compound represented by Chemical Formula 8 include trimethyl aluminum, triethyl aluminum, triisobutyl aluminum, tripropyl aluminum, tributyl aluminum, dimethylchloro aluminum, triisopropyl aluminum, tri-sec-butylaluminium, tricyclopentyl aluminium, triphentylaluminum, triisopentyl aluminum, trihexyl aluminum, trioctyl aluminum, ethyl dimethyl aluminum, methyl diethyl aluminum, triphenyl aluminum, tri-p-tolyl aluminum, dimethyl aluminum methoxide, dimethyl aluminum ethoxide or the like. Finally, non-limiting examples of the compound represented by Chemical Formula 9 include trimethylammonium tetrakis(pentafluorophenyl) borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxy tris(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecyl anilinium tetrakis(pentafluorophenyl)borate or methyldi(dodecyl)ammonium tetrakis(pentafluorophenyl)borate, and the like.

The cocatalyst can be used in an appropriate amount so that the activation of the crosslinking type and non-crosslinking type transition metal compounds can proceed sufficiently.

Meanwhile, as the carrier of the hybrid supported catalyst according to one embodiment, a carrier containing a hydroxyl group or a siloxane group on its surface may be used. Specifically, as the carrier, a carrier containing a hydroxy group or a siloxane group having high reactivity can be used by drying it at high temperature to remove moisture on the surface. More specifically, silica, alumina, magnesia, a mixture thereof, or the like can be used as the carrier. The carrier may be one which has been dried at high temperatures and these may typically include oxides, carbonates, sulphates and nitrate components such as $Na_2O$, $K_2CO_3$, $BaSO_4$ and $Mg(NO_3)_2$.

The hybrid supported catalyst according to the above embodiment can be produced by, for example, a step of supporting a cocatalyst on a carrier; and a step of supporting a crosslinking type transition metal compound and a non-crosslinking type transition metal compound on the cocatalyst-supported carrier one by one in an arbitrary order or supporting them at the same time.

Specifically, in the step of supporting the cocatalyst on the carrier, the carrier dried at a high temperature and the cocatalyst may be mixed and stirred at a temperature of about 20 to 120° C. to prepare the cocatalyst supported carrier.

In the step of supporting the transition metal compound on the catalyst-supported carrier, a crosslinking type and non-crosslinking type transition metal compounds are mixed and added simultaneously to the catalyst-supported carrier; or any one of the crosslinking type and non-crosslinking type transition metal compounds may be added. The obtained solution can then be stirred at a temperature of about 20 to 120° C. If only one type of transition metal compound has been added, a supported catalyst can be prepared by adding residual one type of transition metal compound and stirring the obtained solution at a temperature of about 20 to 120° C.

The crosslinking type transition metal compound and the non-crosslinking type transition metal compound are mixed in a weight ratio of, for example, a weight ratio of 50:1 to 1:1, a weight ratio of 20:1 to 1:1, or a weight of 20:1 to 5:1. If the crosslinking type transition metal compound exceeds the above-mentioned range, the processing load during film formation of the olefin polymer produced therefrom becomes excessively large, which can cause problems in the process, and if the crosslinking type transition metal compound is less than the above range, the mechanical properties of the prepared film may be deteriorated.

The content of the carrier, cocatalyst, cocatalyst supported carrier, crosslinking type and non-crosslinking type transition metal compounds used for the use of the hybrid supported catalyst may be appropriately controlled depending on the physical properties or effects of the desired supported catalyst.

Examples of the reaction solvent in the preparation of the hybrid supported catalyst include aliphatic hydrocarbon solvents such as pentane, hexane, heptane, nonane, decane and isomers thereof; aromatic hydrocarbon solvents such as toluene, xylene and benzene; or a hydrocarbon solvent substituted with a chlorine atom such as dichloromethane and chlorobenzene. Further, since the hybrid supported catalyst reacts sensitively to moisture or oxygen, it can be produced under an inert atmosphere such as nitrogen or argon.

For a specific method for preparing the mixed supported catalyst, reference may be made to Preparation Examples described later. However, the preparation method of the hybrid supported catalyst is not limited to the contents described in the present specification, and the preparation method may further employ a step that is conventionally employed in the technical field to which the present invention pertains, and the step(s) of the preparation method described above can be typically modified by a changeable step(s).

Meanwhile, in the preparation method according to another embodiment, for example, ethylene and an alpha olefin may be used as the olefin monomer. In this case, examples of the alpha olefin include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof. Among them, an olefin polymer satisfying the above-mentioned physical properties can be easily produced by using ethylene and 1-hexene as the olefin monomer.

In the preparation method according to another embodiment, various polymerization processes known as polymerization of olefin monomers such as a continuous solution polymerization process, a bulk polymerization process, a suspension polymerization process, a slurry polymerization process, an emulsion polymerization process or the like may be used for the polymerization of olefin monomers. Such a polymerization reaction can be carried out at a temperature of about 50 to 110° C., or about 60 to 100° C. under a pressure of about 1 to 100 bar or a pressure of about 10 to 80 bar.

In addition, in the polymerization reaction, the hybrid supported catalyst may be used in a state of being dissolved or diluted in a solvent such as pentane, hexane, heptane, nonane, decane, toluene, benzene, dichloromethane, chlorobenzene and the like. At this time, by treating the solvent with a small amount of alkyl aluminum or the like, a small amount of water, air or the like which can adversely affect the catalyst can be removed beforehand.

As an example, when the above-mentioned hybrid supported catalyst is used, an olefin polymer having excellent mechanical properties and high processability can be produced. In particular, the olefin polymer has a very excellent bubble stability and thus is expected to be usefully used as a raw material for a product produced by a melt-blowing process.

The action and effects of the invention will be described more concretely through specific examples of the invention below. However, this examples are presented for illustrative purposes only and the scope of the invention is not intended to be limited thereto in any way.

Preparation Example 1: Preparation of Transition Metal Compound (Metallocene Catalyst Precursor A)

After tetramethylcyclopentadiene (TMCP, 6.0 mL, 40 mmol) was dissolved in THF (60 mL) in a dried 250 mL Schlenk flask, the solution was cooled to −78° C. Then, n-BuLi (2.5 M, 17 mL, 42 mmol) was slowly added dropwise to the solution, and the obtained solution was stirred at room temperature overnight.

Meanwhile, after dichlorodimethylsilane (4.8 mL, 40 mmol) was dissolved in n-hexane in another 250 mL Schlenk flask, the solution was cooled to −78° C. Then, the previously prepared TMCP-lithiation solution was slowly added to this solution. And the obtained solution was stirred at room temperature overnight.

Subsequently, the obtained solution was subjected reduced pressure to remove the solvent from the solution. The resulting solid was dissolved in toluene and filtered to remove residual LiCl, thereby obtaining an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

Indene (0.93 mL, 8.0 mmol) was dissolved in THF (30 mL) in a dried 250 mL Schlenk flask and then the solution was cooled to −78° C. Then, n-BuLi (2.5 M, 3.4 mL, 8.4 mmol) was slowly added dropwise to the solution, and the resulting solution was stirred at room temperature for about 5 hours.

Meanwhile, the previously synthesized intermediate (1.7 g, 8.0 mmol) was dissolved in THF in another 250 mL Schlenk flask and then the solution was cooled to −78° C. Subsequently, to this solution was slowly added the previously prepared indene-lithiation solution. And the resulting solution was stirred at room temperature overnight to give a purple solution.

Thereafter, water was poured into the reactor to quench the reaction, and the organic layer was extracted with ether from the mixture. It was confirmed by $^1$H NMR that dimethyl(indenyl) (tetramethylcyclopentadienyl)silane and other organic compounds were contained in the organic layer. The organic layer was concentrated without purification and used directly for metalation.

The previously synthesized dimethyl(indenyl)(tetramethylcyclopentadienyl)silane (1.7 g, 5.7 mmol) was dissolved in toluene (30 mL) and MTBE (3.0 mL) in a 250 mL Schlenk flask. This solution was then cooled to −78° C., n-BuLi (2.5 M, 4.8 mL, 12 mmol) was slowly added dropwise to the solution, and the obtained solution was stirred at room temperature overnight. However, yellow solids were formed in the solution and were not stirred uniformly, and thus MTBE (50 mL) and THF (38 mL) were further added.

Meanwhile, in a separately prepared 250 mL Schlenk flask, ZrCl$_4$(THF)$_2$ was dispersed in toluene, and the obtained mixture was cooled to −78° C. Then, the lithiated ligand solution previously prepared was slowly injected in the mixture. The obtained mixture was then stirred overnight.

Thereafter, the reaction product was filtered to obtain dimethylsilylene(tetramethylcyclopentadienyl) (indenyl)zirconium dichloride (1.3 g, containing LiCl (0.48 g), 1.8 mmol) in the form of yellow solid. The solvent was removed from the filtrate and washed with n-hexane to obtain an additional yellow solid (320 mg, 0.70 mmol) (total yield 44%).

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d).

The previously synthesized dimethylsilylene (tetramethylcyclopentadienyl)(indenyl)zirconium dichloride (1.049 g, 2.3 mmol) was put in a mini bombe in a glove box. Then, platinum oxide (52.4 mg, 0.231 mmol) was further added to the mini bombe, and the mini bombe was assembled. Then, anhydrous THF (30 mL) was added to the mini bombe using a cannula and charged with hydrogen to a pressure of about 30 bar. Subsequently, the mixture charged in the mini bombe was stirred at about 60° C. for about 1 day, the temperature of the mini bombe was cooled to room temperature, and hydrogen was replaced with argon while gradually lowering the pressure of the mini bombe.

Meanwhile, celite dried in an oven at about 120° C. for about 2 hours was spread on a Schlenk filter, and the reaction product of the mini bombe was filtered under argon. The PtO$_2$ catalyst was removed from the reaction product by the celite. Subsequently, the reaction product from which the catalyst was removed was subjected to reduced pressure to remove the solvent, and thereby dimethylsilylene (tetramethylcyclopentadienyl) (tetrahydroindenyl)zirconium dichloride (hereinafter referred to as 'metallocene catalyst precursor A' (0.601 g, 1.31 mmol, Mw: 458.65 g/mol).

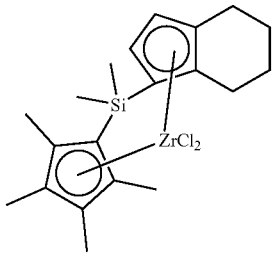

$^1$H NMR (500 MHz, CDCl$_3$): 0.82 (3H, s), 0.88 (3H, s) 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

Preparation Example 2: Preparation of Transition Metal Compound (Metallocene Catalyst Precursor B)

TMCP-Li (1.3 g, 10 mmol), CuCN (45 mg, 5 mol %) and THF (10 mL) were added to a dried 250 mL Schlenk flask. Then, the temperature of the flask was cooled to −20° C. or lower, to which dichlorodiphenylsilane (2.5 g, 10 mmol) was added dropwise, and the obtained mixture was stirred at room temperature for 16 hours.

Then, the temperature of the flask was cooled to −20° C. or lower, and an indene-lithiation solution (1.2 g, 10 mmol in 10 mL of THF) was added dropwise, and the obtained mixture was stirred at room temperature for 24 hours.

The obtained solution was then dried under reduced pressure to remove the solvent from the solution. The obtained solid was dissolved in hexane and filtered to remove residual LiCl. The filtrate was dried under reduced pressure, and hexane was removed from the filtrate, thereby obtaining diphenyl (indenyl)(tetramethylcyclopentadienyl) silane.

Diphenyl(indenyl)(tetramethylcyclopentadienyl)silane (4.2 g, 10 mmol) previously synthesized was dissolved in THF (15 mL) in a 100 mL Schlenk flask. After this solution was cooled to −20° C. or lower, n-BuLi (2.5 M in hexane, 8.4 mL, 21 mmol) was slowly added dropwise to the solution, and the obtained solution was stirred at room temperature for 6 hours.

Meanwhile, ZrCl$_4$(THF)$_2$ (3.8 g, 10 mmol) was dispersed in toluene (15 mL) in a separately prepared 250 mL Schlenk flask, and the obtained mixture was stirred at −20° C. The lithiated ligand solution previously prepared was then slowly injected in the mixture. The obtained mixture was stirred at room temperature for 48 hours.

The obtained solution was then dried under reduced pressure and the solvent was removed from the solution. The obtained solid was dissolved in dichloromethane (DCM) and then filtered to remove residual LiCl. The filtrate was dried under reduced pressure to remove DCM. Then, the obtained solid was added to 30 mL of toluene and stirred for 16 hours, followed by filtration to obtain diphenylsilylene (tetramethylcyclopentadienyl)(indenyl)zirconium dichloride (2.1 g, 3.6 mmol) in the form of a lemon solid (36% yield).

$^1$H NMR (500 MHz, CDCl$_3$): 8.08-8.12 (2H, m), 7.98-8.05 (2H, m), 7.77 (1H, d), 7.47-7.53 (3H, m), 7.42-7.46 (3H, m), 7.37-7.41 (2H, m), 6.94 (1H, t), 6.23 (1H, d), 1.98 (3H, s), 1.95 (3H, s), 1.68 (3H, s), 1.52 (3H, s).

The previously synthesized diphenylsilylene (tetramethylcyclopentadienyl)(indenyl)zirconium dichloride (1.0 g, 1.7 mmol), Pd/C (10 mol %), and DCM (40 mL) were injected in a 100 mL high-pressure reactor, and charged with hydrogen to a pressure of about 60 bar. Then, the mixture charged in the high-pressure reactor was stirred at about 80° C. for about 24 hours. Upon completion of the reaction, the reaction product was passed through a celite pad to remove solids from the reaction product, thereby obtaining diphenylsilylene (tetramethylcyclopentadienyl)(tetrahydroindenyl)zirconium dichloride (hereinafter referred to as "metallocene catalyst precursor B") (0.65 g, 1.1 mmol, 65% yield).

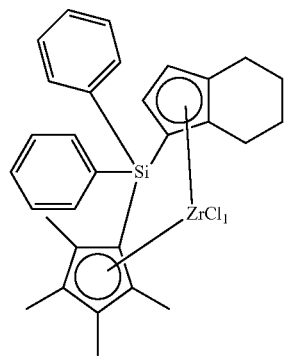

$^1$H NMR (500 MHz, CDCl$_3$): 7.90-8.00 (4H, m), 7.38-7.45 (6H, m), 6.80 (1H, s), 5.71 (1H, s), 3.15-3.50 (1H, m), 2.75-2.85 (1H, m), 2.50-2.60 (1H, m), 2.12 (3H, s), 2.03 (3H, s), 1.97-2.07 (1H, m), 1.76 (3H, s), 1.53-1.70 (4H, m), 1.48 (3H, s).

Preparation Example 3: Preparation of Transition Metal Compound (Metallocene Catalyst Precursor D)

Bis(indenyl)zirconium dichloride (CAS Number: 12148-49-1, manufactured by Strem Chemicals, hereinafter referred to as "metallocene catalyst precursor C" mL) (2.0 g, 5.1 mmol), PtO$_2$ (0.08 g), and DCM (40 mL) were injected in a 100 mL high-pressure reactor, and charged with hydrogen to a pressure of about 60 bar. Then, the mixture charged in the high-pressure reactor was stirred at room temperature for about 24 hours. Upon completion of the reaction, the reaction product was passed through a celite pad to remove solids from the reaction product, thereby obtaining bis (tetrahydroindenyl)zirconium dichloride (hereinafter referred to as "metallocene catalyst precursor D") (1.4 g, 3.5 mmol, 69% yield).

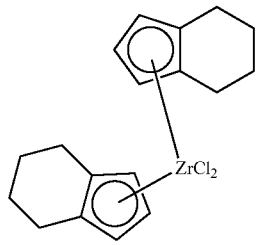

Preparation Example 4: Preparation of Supported Catalyst 4.0 kg of toluene and 800 g of silica (Grace Davison, SP 2410) were added to a 10 L high-pressure reactor and stirred while raising the temperature of the reactor to 40° C. 1.5 kg of 30 wt % methyl aluminoxane (MAO)/toluene solution (manufactured by Albemarle) was added to the reactor, the temperature was raised to 80° C., and then the mixture was stirred at about 200 rpm for about 12 hours.

Meanwhile, the metallocene catalyst precursor A (68 g), the metallocene catalyst precursor D (5.1 g), 1 L of toluene and 25 g of triisobutylaluminum were added to a 2 L Schlenk flask and stirred at 40° C. for 60 minutes. The obtained mixture was then added to the high-pressure reactor, the temperature of the glass reactor was raised to 80° C., and then the mixture was stirred for 2 hours.

Thereafter, the temperature of the reactor was lowered to room temperature, stirring was stopped, and the reaction product was allowed to stand for 30 minutes and then decanted. Then, 3 kg of hexane was added to the reactor to obtain a slurry, which was then transferred to a filter dryer and filtered. The obtained reaction product was purged with argon of 1.5 bar for 10 minutes, and the product was vacuum-dried at 40° C. for 3 hours to obtain a supported catalyst.

Preparation Example 5: Preparation of Supported Catalyst

A supported catalyst was prepared in the same manner as in Preparation Example 4, except that the metallocene catalyst precursor B (60 g) was used instead of the metallocene catalyst precursor A (68 g) in Preparation Example 4, and the metallocene catalyst precursor C (3.9 g) was used instead of the metallocene catalyst precursor D (5.1 g).

Examples 1 and 2: Preparation of Olefin Polymer

A 140 L continuous polymerization reactor capable of an isobutane slurry loop process was used as the polymerization reactor. The continuous polymerization reactor was operated at a reaction flow rate of about 7 m/s. Ethylene, hydrogen gas, and 1-hexene which is a comonomer, used in the polymerization reaction were continuously and constantly added in the contents shown in Table 1. The concentrations of all the gases and comonomers supplied to the continuous polymerization reactor were confirmed by on-line gas chromatography. The supported catalysts were added by preparing the supported catalysts shown in the following Table 1 into an isobutane slurry having the concentrations shown in Table 1. The pressure in the continuous polymerization reactor was maintained at 40 bar, and the polymerization temperature was 84° C.

TABLE 1

|  | Example 1 | Example 2 |
| --- | --- | --- |
| Addition amount of ethylene | 24 kg/hr | 25 kg/hr |
| Addition amount of hydrogen | 8 ppm | 6 ppm |
| Addition amount of 1-hexen | 9.0 wt % (based on total weight of ethylene supplied to a continuous polymerization reactor) | 8.8 wt % (based on total weight of ethylene supplied to a continuous polymerization reactor) |
| Supported catalyst | Supported catalyst prepared in Preparation Example 4 | Supported catalyst prepared in Preparation Example 5 |
| Slurry density[a] | 556 g/L | 552 L |

[a]Slurry density is a density of a polymer present in a continuous polymerization reactor, which is a value measured through a density indicator installed in a continuous polymerization reactor.

Test Example: Evaluation of Physical Properties of Olefin Polymer

The activity of the catalysts used in Examples 1 and 2 and the physical properties of the olefin polymers prepared using the catalysts were measured by the methods described below, and the results are shown in Table 2 below. In order to compare the physical properties of the olefin polymers prepared in Examples 1 and 2 with the physical properties of the commercial products, enable 2010 available from ExxonMobil Company was prepared as Comparative Example 1, M2010 available from Hanwha Chemical Corporation was prepared as Comparative Example 2, and EP2001 product available from Daelim Industrial Co., Ltd. was prepared as Comparative Example 3. And their physical properties were measured by the methods described below and the results are shown in Table 2 below.

(1) Catalytic activity: The catalyst activity was calculated by measuring the weight of silica ($SiO_2$) as a carrier of the catalyst used in the polymerization reaction and the weight of the olefin polymer calculated per hour from the reaction (unit: kgPol./(kg$SiO_2$*hr)).

(2) Bulk density (g/mL) and density (g/cm$^3$): The bulk density of the olefin polymer was determined by measuring the weight (g) of the olefin polymer in a 100 mL container using IPT model 1132, And the density of the olefin polymer was measured according to standard ASTM D792.

(3) Settling efficiency (%): A value obtained by dividing the weight of the polymer prepared in Examples 1 and 2 by the total sum of the weights of ethylene, isobutane and 1-hexene used was multiplied by 100, thereby evaluating the settling efficiency.

(4) Measurement of molecular weight: The weight average molecular weight (Mw) and the number average molecular weight (Mn) of the olefin polymers were measured using gel permeation chromatography (GPC, manufactured by Waters). The analysis temperature was set to 160° C., and trichlorobenzene was used as a solvent, and molecular weight was determined by standardizing with polystyrene.

(5) $MI_{2.16}$ and MFRR (21.6/2.16): Melt Index ($MI_{2.16}$) was measured according to standard ASTM D1238 (Condition E, 190° C., load of 2.16 kg). Melt Flow Rate Ratio (MFRR (21.6/2.16)) was calculated by dividing $MFR_{21.6}$ by $MFR_{2.16}$, $MFR_{21.6}$ was measured at a temperature of 230° C. under a load of 21.6 kg according to ISO 1133, and $MFR_{2.16}$ was measured at a temperature of 230° C. under a load of 2.16 kg according to ISO 1133.

(6) Melt Strength: The melt strength of the olefin polymer was measured using Goettfert Rheotens 71.97 attached to a Model 3211 Instron capillary rheometer. The olefin copolymer melts were discharged through a capillary die (plane die, angle of 180 degree) where a ratio (L/D) of length (L) to diameter (D) is 15. After equilibrating the sample at 190° C. for 10 minutes, the piston was moved at a rate of 1 in/min (2.54 cm/min). The standard test temperature was 190° C. The sample was uniaxially pulled into a set of accelerating nips located below the die 100 mm at an acceleration of 1.2 mm/s². The tension was recorded as a function of the pulling speed of the nip roll. The melt strength was defined as Plato force (mN) before the strands were broken. The following conditions were used for measuring the melt strength.

Plunger speed: 0.423 mm/s
Capillary die L/D: 15
Shear rate: 72/s
Wheel initial speed: 18 mm/s
Wheel acceleration: 12 mm/s²
Barrel diameter: 9.52 mm
Shear rate: average value of 100-150

(8) Strength Factor (SF): SF was determined according to Equation 1 below.

$$SF = Mw/10^4 + 5/(Mw/10^5)*\exp(\text{Ratio of increase in elongation viscosity}) \quad \text{[Equation 1]}$$

(9) Blow-up ratio (BUR): Under the following film forming conditions, if the film was stably produced when controlling the BUR to 2.7 or more, it was marked as 'O', and if the film was stably produced when controlling the BUR to 2.6 or less, it was marked as 'Δ'.

Screw rpm: 40 rpm
Processing temperature: 160° C.
Die gap: 3 mm
Dies: 100 mm
Film thickness: 60 μm

TABLE 2

|  | Example 1 | Example 2 | Comparative Example 1 | Comparative Example 2 | Comparative Example 3 |
|---|---|---|---|---|---|
| Catalytic activity [kgPol./(kgSiO₂*hr)] | 4.1 | 4.7 | — | — | — |
| Bulk density [g/mL] | 0.40 | 0.42 | — | — | — |
| Settling efficiency [%] | 53 | 55 | — | — | — |
| Mn [g/mol] | 43,000 | 29,000 | 26,000 | 24,000 | 25,000 |
| Mw [g/mol] | 122,000 | 146,000 | 88,000 | 83,000 | 90,000 |
| MI$_{2.16}$ [g/10 min] | 0.80 | 1.0 | 1.0 | 1.16 | 0.95 |
| MFRR (21.6/2.16) | 26.4 | 36 | 34.1 | 32.6 | 37.6 |
| Density[g/cm³] | 0.920 | 0.920 | 0.920 | 0.920 | 0.920 |
| Melt strength [mN] | 79 | 95 | 48 | 30 | 39 |
| SF | 80 | 98 | 50 | 30 | 37 |
| Ratio of increase in elongation viscosity | 2.8 | 3.2 | 2 | 1.3 | 1.6 |
| BUR | O | O | Δ | Δ | Δ |

(7) Ratio of increase in elongation viscosity: First, the elongation viscosity of the olefin polymer was measured at Hencky strain rate of 1 s⁻¹ at 170° C. using an elongational viscosity fixture (EVF) attached to the ARES rheometer. When the elongational viscosity increase sharply while increasing steadily with time, the ratio of increase in elongation viscosity was digitized by the following criteria. Specifically, the ratio of increase in elongation viscosity was determined by dividing the measured highest elongational viscosity value by the elongation viscosity value of the extrapolated straight line at the time when the highest elongation viscosity value was obtained. Here, the extrapolated straight line was obtained by extending a straight line where a straight line having the average slope of the section where the elongational viscosity increases steadily with time to a section where the elongational viscosity increases sharply while maintaining the above average slope, as shown in FIG. 2. Specifically, the extrapolated straight line was obtained, using Extrapolate in OriginPro 8.6 program. by extending a straight line (a graph of the elongational viscosity actually measured with time) obtained by specifying the section of the X axis from 0.01 to 0.5 in Extrapolate Manu to a section where the elongational viscosity increases sharply. At his time, in order to obtain the extrapolated straight line, the method uses B-Spline, and Apparent interpolation is used in Extrapolate Manu.

Referring to Table 2, it was confirmed that the olefin polymers prepared according to Examples 1 and 2 have higher molecular weight than the commercially available olefin polymers, but have excellent melt flowability, and particularly exhibited excellent processablity even when the blow-up ratio was adjusted to 2.7 or more.

The invention claimed is:
1. An olefin polymer,
wherein the olefin polymer has SF of 65 or more which is calculated by the following Equation 1:

$$SF = Mw/10^4 + 5/(Mw/10^5)*\exp(\text{ratio of increase in elongational viscosity}) \quad \text{[Equation 1]}$$

in the above equation 1, Mw means a weight average molecular weight,
the ratio of increase in elongation viscosity is a value in which the highest elongational viscosity value measured for the olefin polymer at Hencky strain rate of 1 s⁻¹ at 170° C. using an elongational viscosity fixture attached to the ARES rheometer is divided by the elongational viscosity value of the extrapolated straight line at the time when the highest elongational viscosity value is obtained, wherein the extrapolated straight line is a straight line in which a straight line having the average slope of the section where the elongational viscosity increases steadily with time is extended to a section where the elongational viscosity increases sharply while maintaining the above average slope, wherein a ratio of increase in elongational viscosity is 2.5 or more and 5.0 or less,
wherein a weight average molecular weight of the olefin polymer is 100,000 to 160,000 g/mol, and
wherein the olefin polymer is prepared by a method comprising: a step of polymerizing an olefin monomer in the presence of a hybrid supported catalyst comprising a carrier, a crosslinking type transition metal compound represented by the following Chemical Formula 1 that is supported on the carrier, and a non-crosslinking type transition metal compound represented by the following Chemical Formula 2 that is supported on the carrier:

[Chemical Formula 1]

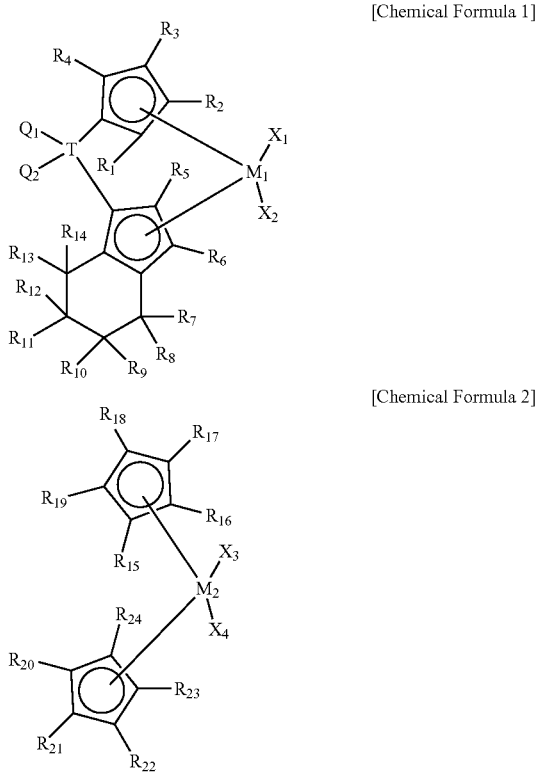

[Chemical Formula 2]

wherein in the above Chemical Formulae 1 and 2, $M_1$ and $M_2$ are the same as or different from each other, and each independently represent Ti, Zr or Hf, $X_1$, $X_2$, $X_3$ and $X_4$ are the same as or different from each other, and each independently represent any one of halogen, a nitro group, an amido group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T is C, Si, Ge, Sn or Pb, $Q_1$ and $Q_2$ are the same as or different from each other, and each independently represent any one of hydrogen, halogen, an alkyl group having 1 to 20 carbon atoms, a heterocycloalkyl group having 2 to 20 carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms, and a heteroaryl group having 5 to 20 carbon atoms, $R_1$ to $R_6$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, $R_7$ to $R_{14}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_7$ to $R_{14}$ are connected with each other to form a substituted or unsubstituted aliphatic or aromatic ring, and $R_{15}$ to $R_{24}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_{15}$ to $R_{24}$ are connected with each other to form a substituted or unsubstituted aliphatic or aromatic ring.

2. The olefin polymer of claim 1, wherein a density of the olefin polymer is 0.910 g/cm$^3$ to 0.940 g/cm$^3$.

3. The olefin polymer of claim 1, wherein a number average molecular weight of the olefin polymer is 20,000 to 50,000 g/mol.

4. The olefin polymer of claim 1, wherein a melt index of the olefin polymer is 0.5 g/10 min or more and less than 3 g/10 min, which is measured at a temperature of 190° C. under a load of 2.16 kg according to standard ASTM D1238.

5. The olefin polymer of claim 1, wherein MFRR (21.6/2.16) of the olefin polymer is 20 or more and less than 40 in which a melt flow rate (MFR$_{21.6}$) measured at a temperature of 230° C. under a load of 21.6 kg according to ISO 1133 is divided by a melt flow rate (MFR$_{2.16}$) measured at a temperature of 230° C. under a load of 2.16 kg according to ISO 1133.

6. The olefin polymer of claim 1, wherein the olefin polymer is a copolymer of ethylene and alpha olefin.

7. The olefin polymer of claim 6, wherein the alpha olefin includes propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof.

8. A method for preparing the olefin polymer according to claim 1, which comprises a step of polymerizing an olefin monomer in the presence of a hybrid supported catalyst comprising a carrier, a crosslinking type transition metal compound represented by the following Chemical Formula 1 that is supported on the carrier, and a non-crosslinking type transition metal compound represented by the following Chemical Formula 2 that is supported on the carrier:

[Chemical Formula 1]

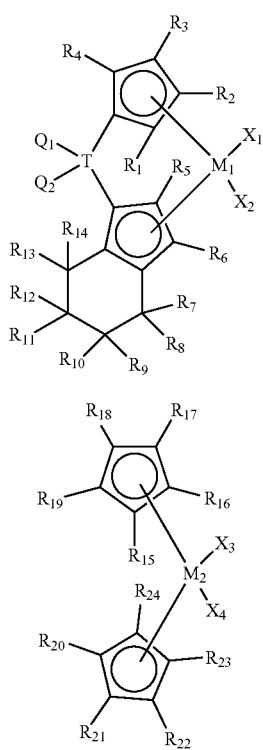

[Chemical Formula 2]

in the above formulae 1 and 2, $M_1$ and $M_2$ are the same as or different from each other, and each independently represent Ti, Zr or Hf, $X_1$, $X_2$, $X_3$ and $X_4$ are the same as or different from each other, and each independently represent any one of halogen, a nitro group, an amido group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T is C, Si, Ge, Sn or Pb, $Q_1$ and $Q_2$ are the same as or different from each other, and each independently represent any one of hydrogen, halogen, an alkyl group having 1 to 20 carbon atoms, a heterocycloalkyl group having 2 to 20 carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms, and a heteroaryl group having 5 to 20 carbon atoms, $R_1$ to $R_6$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, $R_7$ to $R_{14}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_7$ to $R_{14}$ are connected with each other to form a substituted or unsubstituted aliphatic or aromatic ring, and $R_{15}$ to $R_{24}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_{15}$ to $R_{24}$ are connected with each other to form a substituted or unsubstituted aliphatic or aromatic ring.

9. The method for preparing the olefin polymer of claim 8, wherein $R_1$ to $R_4$ are each independently any one of hydrogen, an alkyl group having 1 to 20 carbon atoms, an alkoxy group having 1 to 20 carbon atoms, and an alkenyl group having 2 to 20 carbon atoms;

$R_5$ and $R_6$ are each independently any one of hydrogen, an alkyl group having 1 to 20 carbon atoms, an alkoxy group having 1 to 20 carbon atoms, and an alkenyl group having 2 to 20 carbon atoms;

$R_7$ to $R_{14}$ are each independently any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of $R_7$ to $R_{14}$ are connected with each other to form a substituted or unsubstituted aliphatic ring; and $Q_1$ to $Q_2$ are each independently any one of an alkyl group having 1 to 20 carbon atoms and an aryl group having 6 to 20 carbon atoms.

10. The method for preparing the olefin polymer of claim 8, wherein $X_1$ to $X_4$ are each independently any one of halogen, an alkyl group having 1 to 20 carbon atoms, and an alkoxy group having 1 to 20 carbon atoms.

11. The method for preparing the olefin polymer of claim 8, wherein $R_{15}$ to $R_{24}$ are each independently any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of $R_{15}$ to $R_{24}$ are connected with each other to form a substituted or unsubstituted aliphatic ring.

12. The method for preparing the olefin polymer of claim 8, wherein the crosslinking type transition metal compound represented by Chemical Formula 1 is any one of compounds represented by Chemical Formulas 3 and 4 below:

[Chemical Formula 3]

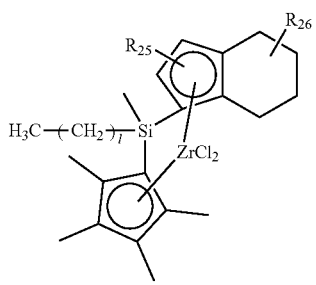

[Chemical Formula 4]

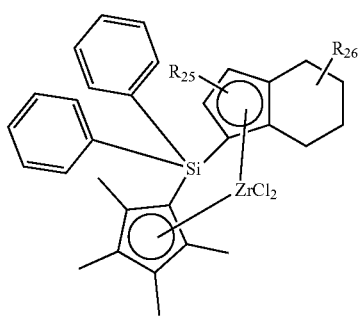

in the above formulae 3 and 4, $R_{25}$ and $R_{26}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and l is an integer between 0 and 5.

13. The method for preparing the olefin polymer of claim 8, wherein the non-crosslinking type transition metal compound represented by Formula 2 is any one of compounds represented by Chemical Formulas 5 and 6 below:

[Chemical Formula 5]

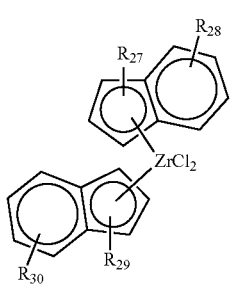

[Chemical Formula 6]

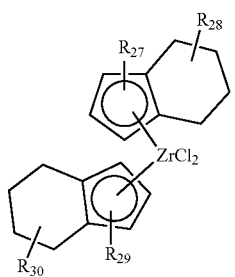

in the above formulae 5 and 6, $R_{27}$ to $R_{30}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms.

14. The method for preparing the olefin polymer of claim 8, wherein it further includes at least one cocatalyst selected from the group consisting of compounds represented by Chemical Formulas 7 to 9 below:

$$R_{31}-[Al(R_{32})-O]_n-R_{33} \quad \text{[Chemical Formula 7]}$$

in the above formula 7, $R_{31}$, $R_{32}$ and $R_{33}$ are each independently any one of hydrogen, halogen, a hydrocarbyl group having 1 to 20 carbon atoms and a hydrocarbyl group having 1 to 20 carbon atoms substituted with halogen, and n is an integer of 2 or more, $$D(R_{34})_3 \quad \text{[Chemical Formula 8]}$$

in the above formula 8,

D is aluminum or boron, each $R_{34}$ is independently any one of halogen, a hydrocarbyl group having 1 to 20 carbon atoms, and a hydrocarbyl group having 1 to 20 carbon atoms substituted with halogen, $$[L-H]^+[Z(A)_4]^- \text{ or } [L]^+[Z(A)_4]^- \quad \text{[Chemical Formula 9]}$$

in the above formula 9,

L is a neutral or cationic Lewis base, H is a hydrogen atom,

Z is a Group 13 element, and A is each independently any of a hydrocarbyl group having 1 to 20 carbon atoms; a hydrocarbyloxy group having 1 to 20 carbon atoms; and substituents in which at least one hydrogen atom of the above substituents is substituted with at least one substituent of halogen, a hydrocarbyloxy group having 1 to 20 carbon atoms and a hydrocarbylsilyl group having 1 to 20 carbon atoms.

15. The method for preparing the olefin polymer of claim 8, wherein the carrier is silica, alumina, magnesia, or a mixture thereof.

16. The method for preparing the olefin polymer of claim 8, wherein the crosslinking type transition metal compound represented by Chemical Formula 1 and the non-crosslinking type transition metal compound represented by Chemical Formula 2 is contained in a weight ratio of 50:1 to 1:1.

17. The method for preparing the olefin polymer of claim 8, wherein ethylene and an alpha olefin are used as the olefin monomer.

18. The method for preparing the olefin polymer of claim 17, wherein propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof are used as the alpha olefin.

* * * * *